H. R. STAFFORD.
CAR TRUCK.
APPLICATION FILED MAY 12, 1914.
1,114,061.
Patented Oct. 20, 1914.
2 SHEETS—SHEET 1.
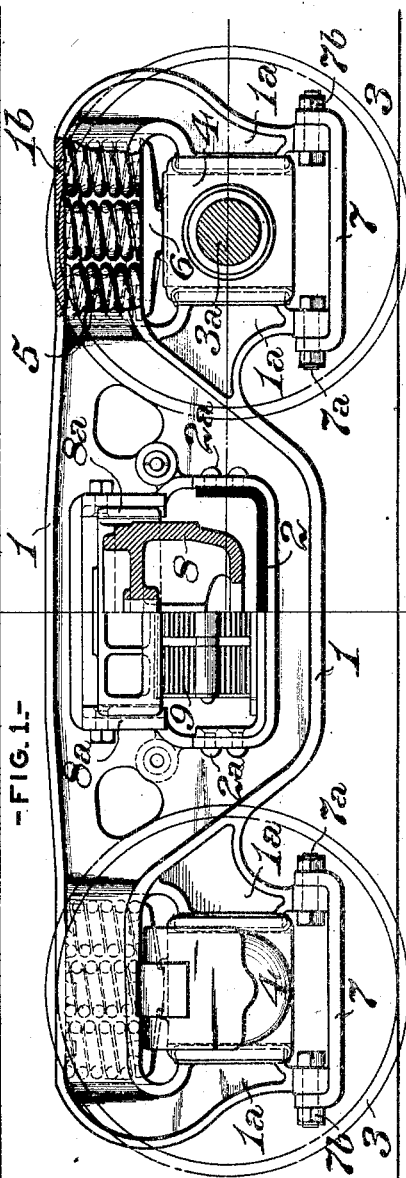
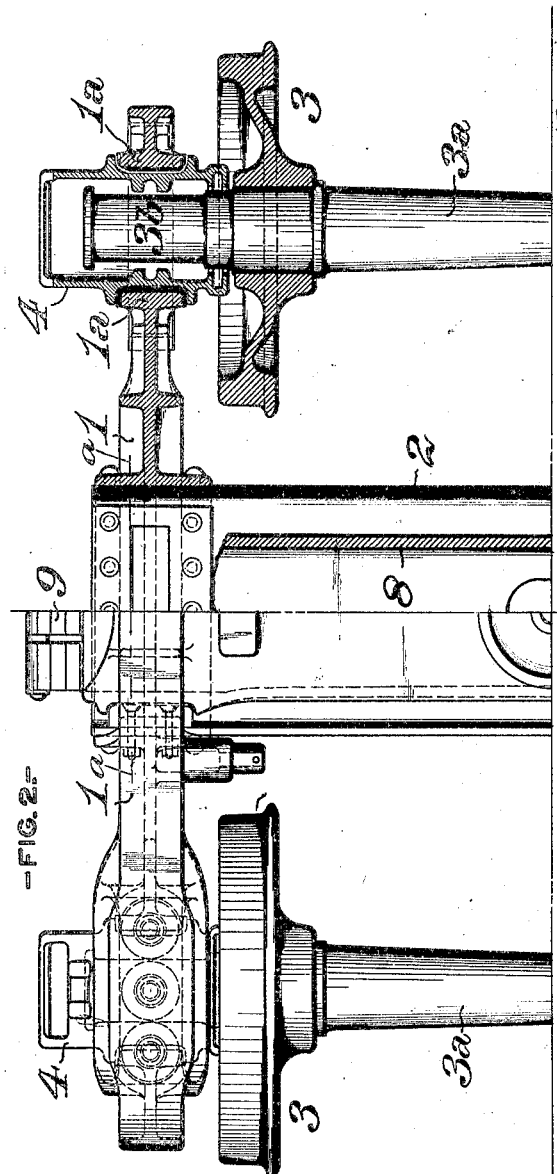

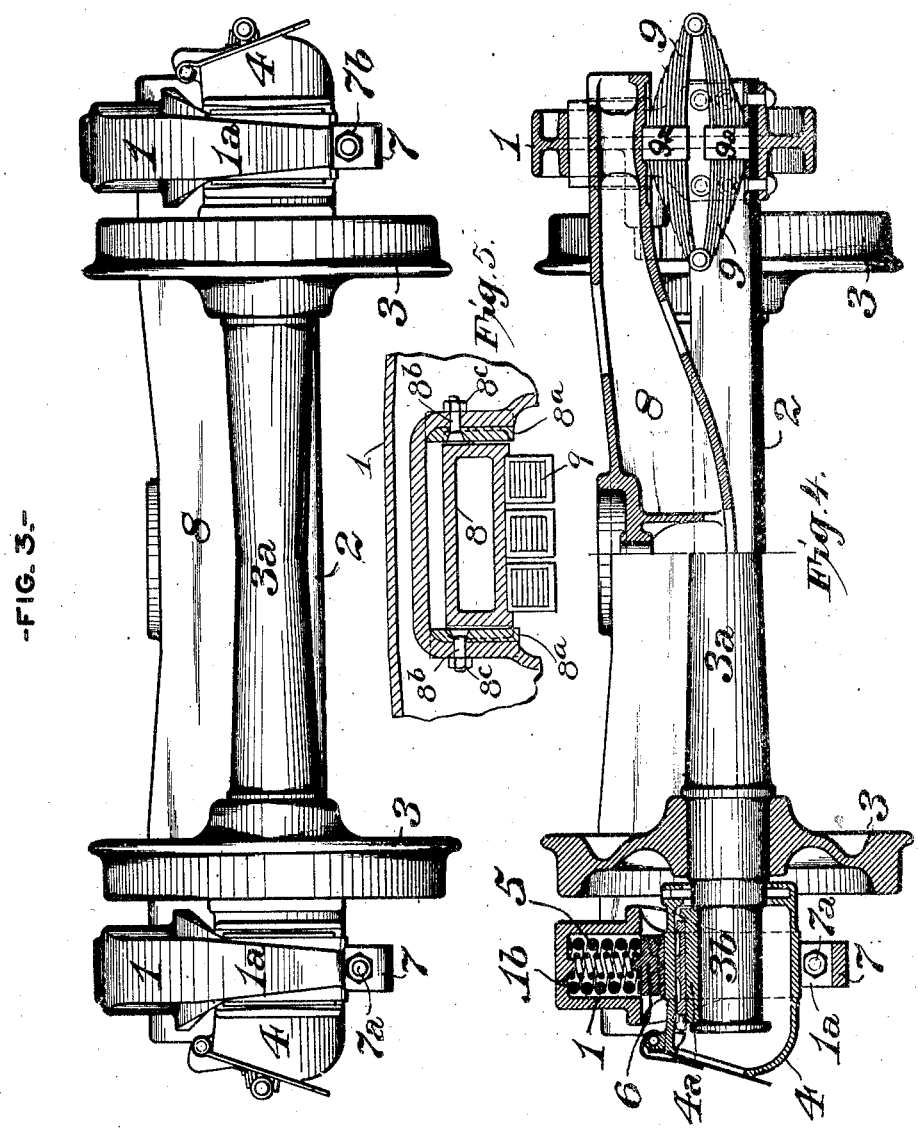

UNITED STATES PATENT OFFICE.

HAL R. STAFFORD, OF PLAINFIELD, NEW JERSEY.

CAR-TRUCK.

1,114,061.

Specification of Letters Patent.

Patented Oct. 20, 1914.

Application filed May 12, 1914. Serial No. 838,183.

*To all whom it may concern:*

Be it known that I, HAL R. STAFFORD, of Plainfield, in the county of Union and State of New Jersey, have invented a certain new and useful Improvement in Car-Trucks, of which improvement the following is a specification.

My invention relates to four wheel trucks for railroad rolling stock, of the type in which the side frames are formed in integral castings, and its object is to provide a truck of such type which shall possess easy riding qualities and the capacity of a limited degree of relative vertical movement of the side frames, together with facilities of ready renewal and replacement of the truck bolster and improved means of connecting the pedestal jaws.

The improvement claimed is hereinafter fully set forth.

In the accompanying drawings: Figure 1 is a view, the left hand half of which is a plan or top view of a car truck embodying my invention, and the right hand half, a horizontal section, in the plane of the centers of the axles; Fig. 2, a view, the left hand half of which is a side elevation, and the right hand half, a vertical longitudinal section of the same; Fig. 3, an end view, in elevation; Fig. 4, a view, the left hand half of which is a vertical transverse section, in the plane of one of the axles, and the right hand half, a similar section, in the middle transverse plane of the truck; and, Fig. 5, a vertical transverse section through the bolster, and partial vertical longitudinal section through one of the side members, on the line *a—a* of Fig. 2.

My invention is herein exemplified in a four wheel car or tender truck, the frame of which is composed of two side members, 1, each of which is an integral casting, and a spring plank, 2, which is of U or channel section, and is formed of wrought metal, the thickness of which is such as will admit of a limited degree of longitudinal flexibility, while possessing sufficient strength to enable it to perform the function of the connecting element of the two sides members, to which its upwardly extending webs are secured, adjacent to their ends, by rivets, $2^a$, and which it holds square and parallel horizontally. The ends of the spring plank are fitted in the bottoms of openings in the side members, and a bolster, hereinafter described, extends through the upper portions of said openings. Pairs of downwardly depending pedestral jaws, $1^a$, are formed on the side members, and a spring bearing, $1^b$, is formed in the upper web of each side member, above each of its pairs of pedestal jaws.

The truck wheels, 3, are secured, in the usual manner, on truck axles, $3^a$, the journals, $3^b$, of which, rotate in bearings, $4^a$, fitted in axle boxes, 4, each of which is adapted to traverse vertically between the members of one of the pairs of pedestal jaws, $1^a$. The truck frame is supported on the axle boxes through the intermediation of helical springs, 5, a nest or plurality of which is interposed between each of the spring bearings, $1^b$, of the side members, and an equalizer, 6, which bears centrally on the axle box below said spring seat, and provides, on its upper surface, a lower bearing for the springs. The lower ends or toes of each pair of pedestal jaws, $1^a$, are connected by a pedestal binder, 7, which is a bar of rectangular section, having its smaller dimension in a vertical plane, and having perpendicularly upwardly turned ends, which abut against perpendicular faces on the outer sides of the pedestal jaws, and are each secured to one of said jaws by a bolt, $7^a$, and nut, $7^b$. The binders therefore, in and of themselves, act as clamps for the pedestal jaws, the only function of the bolts being to suspend them in position. This construction affords all necessary clearance between the axle boxes and pedestal binders, and greater clearance above the track rail than the ordinary forms, and has the further advantage that if one of the bolts, $7^a$, should be accidentally displaced, the clamping effect of the binder is not diminished.

A bolster 8, which may be either of the plain or lateral motion type, as preferred, is fitted between vertical guide shoes, $8^a$, secured detachably to the side frame members, the thickness of which shoes is, as shown in Fig. 2, such that when detached and dropped out of operative position, the lateral projections on the bolster, which normally fit against their ends, will be entirely clear of the openings in the side frames within which the bolster is located. The novel and advantageous result of this construction is that by dropping the shoes, the bolster may be withdrawn horizontally without the necessity of detaching the spring plank from the side frame members, which obtains in the ordinary constructions. The guide shoes, 8ª, are connected to the side frame members by bolts, 8ᵇ, extending transversely to the bolster and having countersunk heads on their inner ends, which adjoin the sides of the bolster, and nuts, 8ᶜ, on their outer ends. It will be seen that as the heads of the connecting bolts are covered by the bolster, it will not be possible for said bolts to be displaced in the event of the nuts being jarred off in service, as from time to time is liable to occur in all truck structures. This is an important safeguard, it it prevents the dropping of the shoes and resultant displacement of the bolster, which is always to be apprehended when the shoes are held by bolts extending transversely through the side members and having no protection against dropping out when a nut should happen to be jarred off. It will further be seen that by providing openings in the side frame members, the lower portions of which are of greater width than the upper portions in which the guide shoes are fitted, I am enabled to secure the ends of the spring plank horizontally to the side frame members, that is to say, by horizontal rivets passing through its upturned flanges and through the adjoining portions of the side frame members. This construction presents the double advantage of attaining a much more rigid and substantial connection than if the side flanges of the spring plank are spaced apart from the side members to allow the guide shoes to be dropped into the spaces, and of permitting the guide shoes to be dropped sufficiently far to allow the bolster to be removed endwise, without contacting with, or being interfered with, by the side flanges of the spring plank. The bolster, 8, is supported, adjacent to its ends, on the spring plank, by pairs of elliptic springs, 9, the bands, 9ª, of which, bear against the bottom of the bolster and the top of the spring plank, respectively. The helical springs, 5, of the axle boxes and the bolster springs, 9, being in series between the axle boxes and the superimposed load on the truck, the former absorb sudden shocks of comparatively small amplitude, while the latter compensate for vibrations of greater magnitude. The two sets of springs having different periods of vibration, those of the axle box springs being of greater frequency than those of the bolster springs, the tendency for oscillations of the load to synchronize is prevented.

I claim as my invention and desire to secure by Letters Patent:—

1. In a railroad truck, the combination of two integral cast metal side members, each provided with pedestal jaws and having a central opening, the width of the lower portion of which is greater than that of its upper portion, bolster guide shoes fitted in the upper narrower portions of the side member openings, a spring plank secured horizontally at its ends to the sides of the wider lower portions of said openings, a bolster supported on the spring plank and fitted to move vertically between the guide shoes, the maximum width of said bolster being less than that of the narrower upper portions of the side member openings, and bolts extending transversely to the bolster and detachably connecting the guide shoes to the side members.

2. In a railroad truck, the combination of two side members, each provided with pairs of pedestal jaws, axle boxes fitted with the capacity of relative vertical movement in the pedestal jaws, equalizers, each seated on one only of the axle boxes, independently of the others, and nests of helical springs interposed between the equalizers and bearings in the side members, and disposed symmetrically with the longitudinal central planes of the axle boxes.

3. In a railroad truck, the combination of two integral cast metal side members, each provided with pairs of pedestal jaws; bolster guide shoes detachably connected to the side members; a wrought metal spring plank, of channel section, secured at its ends to the side members, below the bolster guide shoes; axle boxes fitted with the capacity of relative vertical movement in the pedestal jaws; equalizers seated on the axle boxes; nests of helical springs interposed between the equalizers and bearings in the side members; a bolster fitted to move vertically between the guide shoes; and springs supporting said bolster on the spring plank.

HAL R. STAFFORD.

Witnesses:
J. SNOWDEN BELL,
EDWARD A. WRIGHT.